Nov. 28, 1950     A. L. GRISÉ     2,531,620
COMPENSATING MEANS FOR DISPLACEMENT METERS
Filed Feb. 3, 1949     2 Sheets-Sheet 1
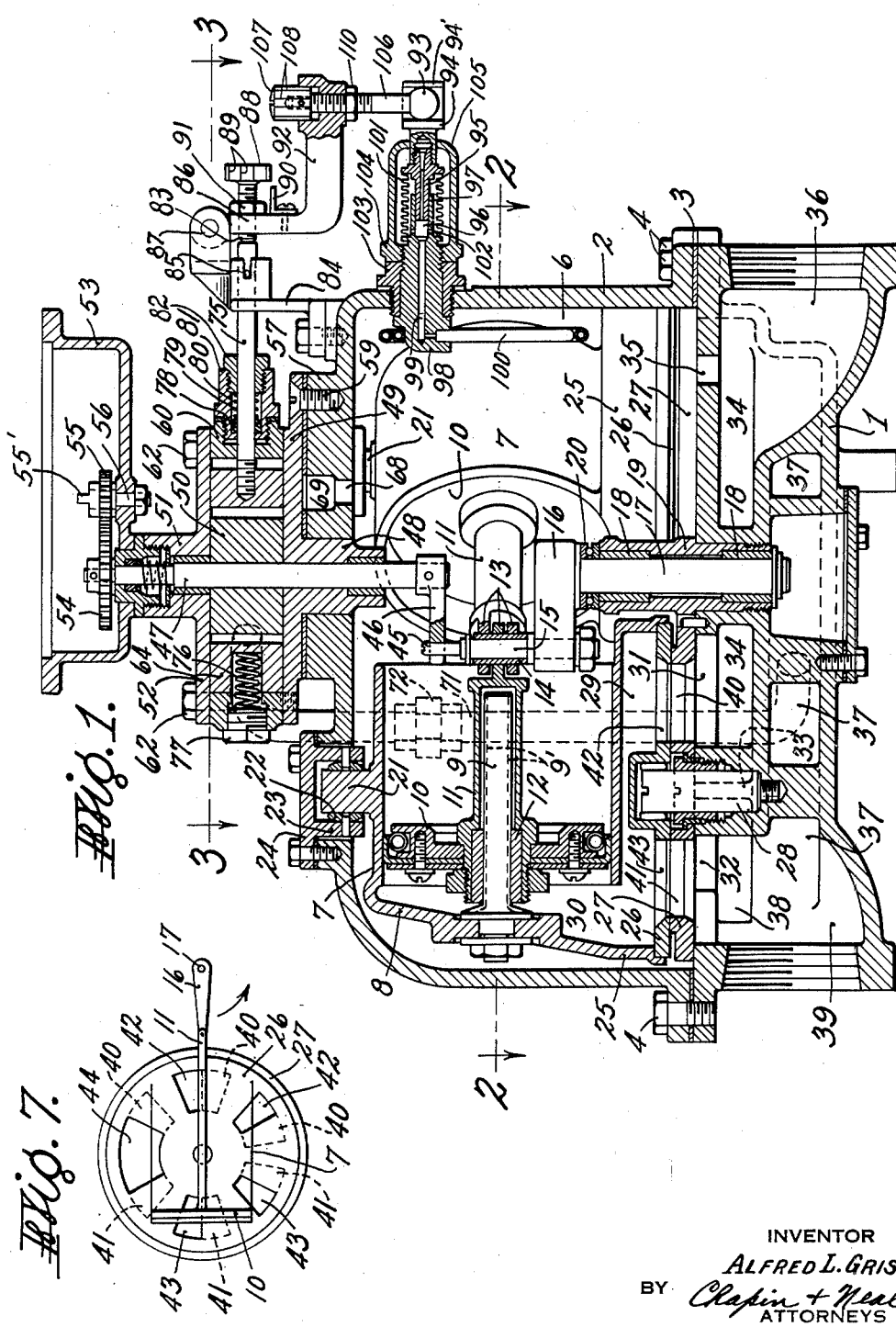
INVENTOR
*Alfred L. Grisé*
BY *Chapin + Neal*
ATTORNEYS

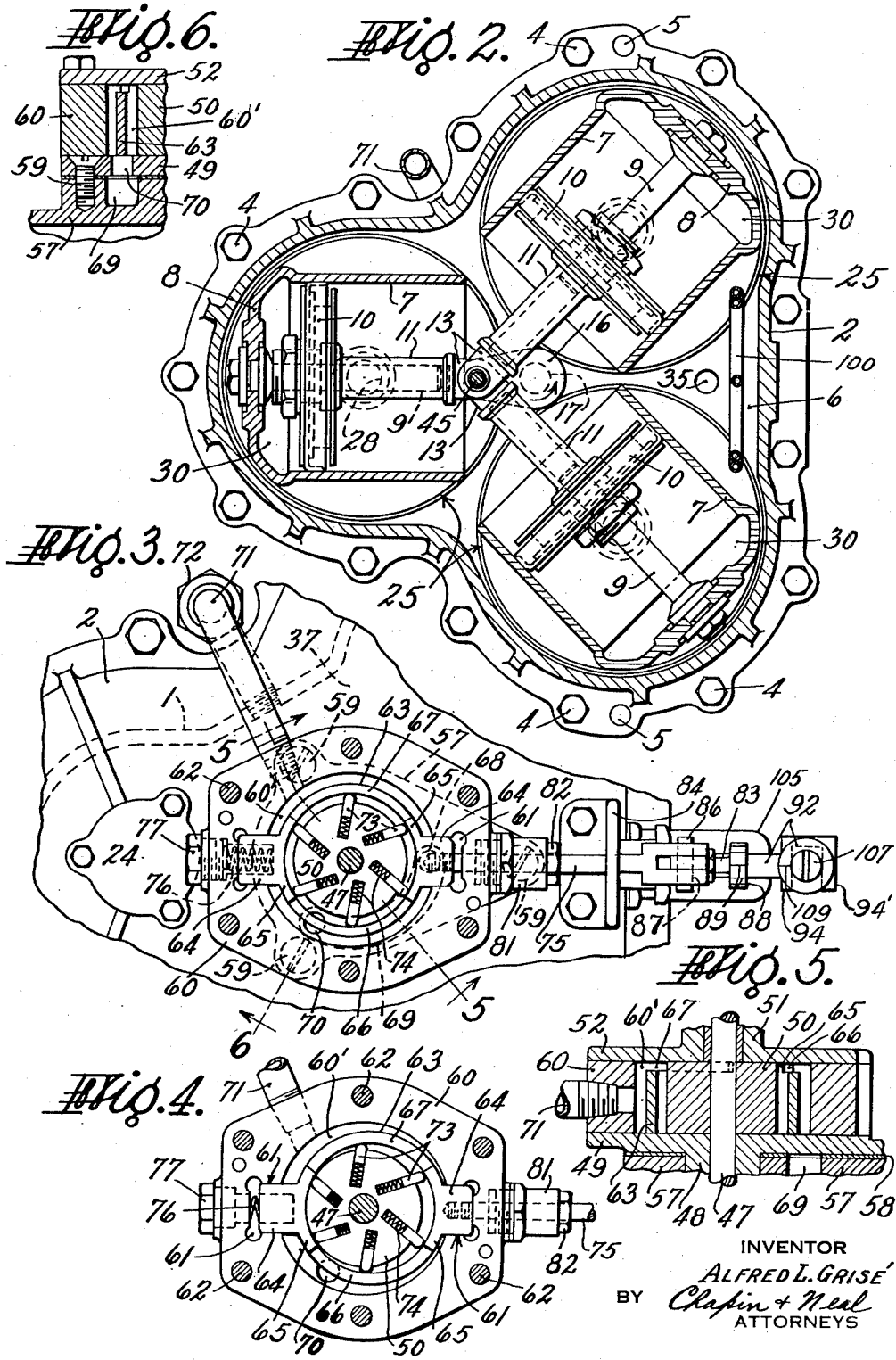

Patented Nov. 28, 1950

2,531,620

UNITED STATES PATENT OFFICE 2,531,620

COMPENSATING MEANS FOR DISPLACEMENT METERS

Alfred L. Grisé, Springfield, Mass., assignor to Gilbert & Barker Manufacturing Company, West Springfield, Mass., a corporation of Massachusetts Application February 3, 1949, Serial No. 74,363

7 Claims. (Cl. 73—232)

This invention relates to improvements in meters for measuring liquids and, more particularly, to means for varying the flow of liquid through the meter to compensate for variations in the temperature or the density of the liquid or for calibration purposes.

It has been common, heretofore, to compensate for such variations by varying the speed ratio of a transmission between the driving shaft of the meter and the driving shaft of the register. The displacement of a given quantity of liquid, say 231 cubic inches, is arranged to turn the register shaft just enough to indicate one gallon at all temperatures within a selected range. To do this, the register shaft has to be turned various amounts for the 231 cubic inches displaced by the meter accordingly as the temperature of the liquid being measured varies from a predetermined standard, say 60° Fahrenheit. If the liquid is above the standard temperature, its expansion will cause more to be delivered than the quantity indicated on the register, unless the register driving shaft is turned a less amount for the same volumetric displacement of liquid from the meter. Also, if the liquid is below the standard temperature, its contraction will cause less to be delivered than the quantity indicated on the register, unless the register driving shaft is turned a greater amount for a given volumetric displacement of liquid from the meter. Hence, a variable speed transmission was provided between the meter and register shafts and the speed ratio between such shafts is variable by variations in temperature of the liquid being measured or by its density or preferably by both.

The object of this invention is to provide a means for compensating for variations in temperature and specific gravity of the liquid being measured, which means does not depend on varying the speed ratio between the driving shaft of the meter, so that a given volumetric displacement of liquid from the meter, say 231 cubic inches, will always turn the register the same amount, say enough to indicate one gallon and the correction is made by using a variable capacity pump, driven by the meter, and arranged to pump liquid from the inlet through a by-pass to the outlet of the meter without passing through the displacement mechanism of the meter. The rate at which this pump operates is automatically varied in accordance with the temperature of the liquid, to pump more or less liquid as is needed, so that the total liquid delivered from the meter, when the register shaft is turned enough to indicate one gallon, will be exactly of that volume which when brought to standard temperature will equal 231 cubic inches.

The invention will be disclosed with reference to one illustrative embodiment of it in the accompanying drawings, in which—

Fig. 1 is a sectional elevational view of a piston meter embodying the invention;

Figs. 2 and 3 are sectional plan views taken on the lines 2—2 and 3—3, respectively, of Fig. 1;

Fig. 4 is a fragmentary sectional plan view taken similarly to Fig. 3 but showing the pumping elements in different relative positions;

Figs. 5 and 6 are cross sectional views taken on the lines 5—5 and 6—6, respectively, of Fig. 3; and Fig. 7 is a diagrammatical view illustrative of the valve action.

In these drawings, the calibrating means of this invention has been shown in connection with a positive displacement meter of the type disclosed in my copending application Serial No. 779,096, filed Oct. 10, 1947. The invention, however, is capable of use in any other meter of the positive-displacement type. The drawings, therefore, merely show by way of illustrative example one meter of the aforesaid type.

Referring to Fig. 1, the casing of the meter includes a base casting 1 and a dome casting 2, the marginal flanges of which are clamped together with a gasket 3 therebetween by a plurality of cap screws 4. The two castings are accurately located in proper relation by dowel pins 5 (Fig. 2) fixed in one casting and closely fitting in holes in the other casting. The dome 2 (Fig. 1) is hollow and affords within it a chamber 6, in which all the moving parts of the meter are located.

There are a plurality (three as shown in Fig. 2) of single acting cylinders 7, which are located generally radially of chamber 6 and have their inner open ends in constant communication with the chamber. The outer end of each cylinder is closed by an integral head 8, to which is fixed one end of a rod 9 which extends forwardly and coaxially of the cylinder. Slidable in each cylinder is a suitable piston 10 (Fig. 1), having a hollow piston rod 11 containing a bearing 12 slidably engaging the rod 9. The outer end of each hollow rod 11 is closed and protruding from this closed end is a perforated ear 13. A groove 9' in each rod 9 enables liquid to pass into and out of the interior of the hollow piston rod, which it supports, as is necessary when such rod respectively moves outwardly and inwardly. The several perforated ears are located at different levels and a sleeve 14 (Fig. 1) extends through the perforations of all the ears. This sleeve is rotatably mounted on a vertically upstanding crankpin 15, fixed to a crank 16, which in turn is fixed to the upper end of a shaft 17. The latter is rotatably mounted in sleeve bearings 18, fixed in a post 19, which is threaded at its lower end in base 1 and upstands therefrom, supporting on its upper end a thrust bearing 20, which in turn supports the crank and shaft.

Each cylinder 7 is mounted for oscillation about a vertical axis. The upper portion of the peripheral wall of each cylinder has a trunnion 21, which is rotatably received in a bearing 22, pivotally supported in a hollow tubular depending part 23 of a cap 24, secured as indicated in a leak-tight manner to dome 2. Beneath each cylinder 7 and formed integrally therewith is an annular wall 25 and fixed thereto is a ported, circular valve disk 26, which rests on a similar ported circular valve disk 27, fixed to the top of base member 1. A stud 28 is threaded into base member 1 and extends upwardly with its axis aligned with the trunnion 21 which directly overlies it, extending through the two coacting valve disks 27 and 26, coaxially thereof, and rotatably engaging the upper valve disk 26. Between each upper valve disk 26 and the overlying portion of cylinder 7 is a chamber 29 constantly communicating with the outer end of the cylinder by way of a passage 30 formed in the head of the cylinder. It will be clear from Fig. 2 that as each piston reciprocates in its cylinder, the latter is caused to swing about the common vertical axis of its trunnion 21 and the stud 28 which directly underlies such trunnion.

The oscillation of each cylinder 7 moves the upper valve disk 26 and causes ports in it to move into and out of communication with ports in the lower valve disk 27 in order to control the admission of liquid to and the discharge of liquid from the overlying cylinder. Formed in base 1 beneath each lower valve disk 27 are two substantially semi-cylindrical inlet and outlet openings 31 and 32, respectively, separated by a partition 33. All the inlet openings 31 communicate with a central inlet chamber 34 formed at an upper level in base 1. This chamber is connected with the chamber 6 in dome 2 by a hole 35. Liquid enters chamber 34 by means of the port 36, adapted for connection to a source of liquid under pressure. Formed in base 2 at a lower level than inlet chamber 33 is an outlet chamber 37. All the outlet openings 32 communicate with this chamber 37 by means of semi-cylindrical openings 38. Chamber 37 has an outlet port 39 adapted for connection to a discharge pipe. The ports in the valve disks 26 and 27 are indicated diagrammatically in Fig. 7 in connection with one cylinder only. The lower valve disk 27 has three inlet ports 40, all overlying the inlet opening 31 in base 1, and three outlet ports 41, all overlying the outlet opening 32 in base 1. In the overlying valve disk 26 there are two inlet ports 42, two outlet ports 43 and a large port 44, which serves part of the time as an inlet port and part of the time as an outlet port.

This valve mechanism operates in the following manner. With the piston 10 at its outer dead center position, all the ports are closed. As crank 16 turns counterclockwise, the valve disk 26 is turned clockwise and ports 42 are carried into communication with two of the inlet ports 40 and port 44 is carried into communication with the other inlet port 40. Liquid enters the outer end of cylinder 7 and forces the piston 10 inwardly rotating the crank 16. The inlet ports remain open during all the inward stroke of the piston, while the outlet ports are closed. The effective area of inlet port opening increases during the first part of the inward stroke of the piston, reaching a maximum when the piston is nearly halfway on its inward stroke, when the cylinder 7 turns counterclockwise and causes such inlet port area to decrease until the piston reaches its outer dead center position when the inlet ports are all closed. On the return stroke of the piston, all the inlet ports remain closed and the two outlet ports 43 in disk 26 move into communication with two of the ports 41 in disk 27, while the large port 44 in disk 26 moves into communication with the other outlet port 41 in disk 27. Liquid then discharges from the cylinder. The effective discharge port area gradually increases, reaching its maximum after the piston has traveled a little more than half way on its return stroke, when the cylinder 7 reverses and swings clockwise. The effective discharge port area then gradually decreases, reaching zero when the piston arrives at its outer dead center position.

The crank shaft 17 is adapted to drive a suitable register through any suitable transmission. As shown in Fig. 1, the crankpin 15 is provided with an upward coaxial extension 45, the upper end of which is engaged in a radial slot in the outer end of a crank 46. This crank is fixed to the lower end of a shaft 47, which extends vertically upward out of dome 2. This shaft passes through the hub 48 on the lower end plate 49 of a pump, through the rotor 50 of the pump, through the hub 51 on the upper end plate 52 of the pump and into a cup-shaped casting 53, which is adapted to support a register. The shaft has bearings in said hubs and is fixed to the rotor. In the interior of casting 53 are intermeshing gears 54 and 55, the former fixed to the upper end of shaft 47 and the latter being rotatably mounted on a stud 56 fixed to and upstanding from the bottom wall of casting 53. The hub of gear 55 has a tongue 55' for coupling engagement with the drive shaft (not shown) of the register.

The pump is superposed on the dome 2. The hub 48 of its lower end plate 49 fits into a central hole extending through the dome and the plate 49 is supported from a pad 57 formed on top of the dome through the intermediary of a gasket 58. Screws 59 secure plate 49 to pad 57. The pump has a central member 60 of the shape shown in Fig. 3 and having a cylindrical opening 60', extending vertically therethrough, and two diametrically opposite, approximately rectangular radially disposed recesses 61. This member 60 (Fig. 1) rests on plate 49 which closes the lower ends of the opening 60' and the recesses 61. The upper ends of this opening and these recesses are closed by the upper end plate 52 which rests on top of member 60. Cap screws 62 clamp the plates 49 and 52 against the bottom and top respectively of member 60. The pump includes an adjustable stator (Fig. 3) in the form of a circular ring 63, located in opening 60', and two diametrically-opposed, rectangular end parts or slides 64 which extend radially outward from ring 63 and are slidably engaged one in each of the recesses 61. This stator rests on end plate 49 (Fig. 1) and the upper face of each slide 64 and the upper face of each of two sections 65 of ring 63 slidably engage the upper plate 52. These portions 65 lie one adjacent each slide 64. Between the portions 65, the upper part of ring 63 is spaced from upper plate 52 (Fig. 5), providing inlet and outlet ports 66 and 67, respectively for connecting the upper and lower portions of the interior of ring 63 to the upper and lower portions, respectively, of the opening 60'. The latter is partitioned by the stator 63, 64. Liquid from the chamber 6 in dome 2 enters through a hole 68 (Fig. 1) in the dome into a curved passage 69 (Fig. 3) formed in pad 57 and from this passage flows out through a hole 70 (Fig. 6) into the lower portion of opening 60'. The upper portion of the latter is connected by a pipe 71 (Fig. 5), having a union 72 therein, to the discharge chamber 37 in base 1. The cylindrical opening in the stator receives the pump rotor 50 (Fig. 3), which is slotted to receive a plurality (six as shown) of vanes 73, which are pressed outwardly, as by springs 74, to engage the internal periphery of the stator opening. The pump stator may be moved by means of a rod 75, fixed to the outer end of one of the slides 64 and by a spring 76, housed in part in a radial opening in the outer end of the other slide 64 and acting between the latter and a plug 77, threaded into member 60, to move the stator to the right as viewed in Fig. 3 and 4 when permitted by rod 75. The rod extends outwardly through a suitable sealing means, herein shown as a packing washer 78 on the rod 75 pressed by a coil spring 79 against the inner end wall of the chamber 80 in which the spring and washer are housed. This chamber is formed in a member 81 threaded into member 59. The outer end of member 81 consists of a removable plug 82. When the rod 75 is moved to the left as far as possible, the stator ring 63 is located coaxially of the rotor 50 and no liquid will be pumped. When the rod 75 is moved to the right from the Fig. 3 position, the spring 76 will shift the ring 63 out of coaxial relation and enable liquid to be pumped at various rates increasing as the stator is shifted to the right and reaching a maximum when the stator reaches the Fig. 4 position.

The stator-shifting rod 75 may be moved manually for calibration purposes by means of a screw 83. The rod is slidably supported near its outer end in a bearing formed on a bracket 84, fixed as indicated to the top of dome 2. This bearing is slotted horizontally and a cross pin 85 in rod 75 has its ends engaged in the slots in the bearing to hold the rod from turning. The screw 83 is threaded in a lever 86 pivoted at its upper end on a stud 87 mounted in bracket 84. The inner end of screw 83 bears directly against the outer end of rod 75. The outer end of the screw has a head 88 for convenience in turning it. Head 88 has graduations 89 on its periphery to be read with reference to a pointer 90 fixed to arm 86. A lock nut 91 is provided on screw 83 to engage lever 86 and hold the screw in its various positions of adjustment.

The rod 75 may also be moved automatically, as for example to compensate for variations in the temperature of the liquid passing through the meter. For this purpose, the lever 86 is arranged to be actuated from a suitable thermostat. The lower end of lever 86 has a horizontal portion 92 which is located between and is slidably engaged with a pair of flanges 94 and 94' fixed on the outer end of the piston element 95 of the thermostat. Such element is slidably mounted in the bore 96 of a cylinder 97 formed on the outer end of a member 98, which extends through and is supported from a wall of dome 2. Member 98 has a passage 99 extending from the inner end of bore 96 to one end of a tube 100 which has such end fixed to the member 98 and is bent to form two coils and terminates with its other end closed. The coils are located in the liquid in chamber 6. To prevent leakage, the cylinder 97 and piston 95 are interconnected by an expansible and contractible bellows 101. Holes 102 in the inner end of cylinder 97 permit liquid to flow back and forth into and out of the bellows 101 as the piston 95 respectively moves outwardly or inwardly in its cylinder. The member 98 has on its inner end a flange which abuts the inner end face of a bushing 103, threaded into a side wall of dome 2. The outer end of member 98 is threaded to receive a nut 104, by which it is clamped to the bushing 103. Nut 104 has a hollow extension 105 which encases the cylinder 97, bellows 101 and piston 95, except for the outer end which engages ball 93. It will be clear that expansion of the liquid in coils 100 due to increase in temperature of the liquid in chamber 6 will through piston 95 and flange 94 swing lever 86 counterclockwise, allowing rod 75 to be moved to the right by spring 76 and thus shifting the stator 63 to increase the pumping rate and that contraction of the liquid in coils 100, caused by decrease in temperature of the liquid in chamber 6, will through flange 94' swing lever 86 clockwise and move rod 75 to the left, thus shifting the stator 63 to decrease the pumping rate.

It is also desirable to be able to adjust the meter for variations in the specific gravity of the liquid being measured. This is effected by changing the point of engagement of ball 93 with flange 94, moving it radially of the flange to increase or decrease the effective length of the lever arm, comprising the portion 92 and a rod 106, which is fixed to lever 86 and carries ball 93. As shown, rod 106 has a screw threaded engagement with portion 92 and can be turned by means of a head 107, fixed thereto and bearing graduations 108 on its periphery, which may be read with reference to a mark 109 (Fig. 3) on portion 92. A lock nut 110 (Fig. 1) is provided on rod 106 to hold it in the various positions of adjustment to which it may be moved.

The operation of the displacement measuring means of the meter is the usual one. Liquid under pressure supplied to the inlet 36 is conducted through the valve mechanism described successively into the several cylinders 7 to successively move the pistons 10 inwardly and cause the crankshaft 17 to be turned. The rotation of the crankshaft causes the pistons to be successively moved outwardly to successively expel the liquid from the cylinders through the valve mechanism described into the outlet 39. The crankshaft 17 may drive any suitable registering mechanism (not shown) for indicating the quantity of liquid which passes through the meter, say 231 cubic inches, the shaft 17 is moved a predetermined amount, say enough to cause the register to indicate one gallon.

The liquid dispensed may vary in temperature and density and it is necessary to compensate for these variations in order that the indications of the registering mechanism shall be accurate. The accepted standard is that the register shall indicate one gallon, when the liquid measured by the meter is at sixty degrees Fahrenheit equals exactly 231 cubic inches or one gallon. If the liquid is at a temperature higher than sixty degrees, the 231 cubic inches, which is delivered when the register indicates one gallon, will when brought to standard temperature be less than one gallon. And if the liquid is at a temperature lower than sixty degrees, the 231 cubic inches delivered by the meter will, when brought to standard temperature, be more than one gallon. This invention compensates for the temperature variations by delivering liquid from the inlet 36 to the outlet 39 through a by-pass comprising the parts 35, 6, 68, 69, 70, 71 and 37 without passing through the measuring cylinders and at a rate which is variable according to the temperature and specific gravity of the liquid. The variable capacity pump which is driven by the crankshaft 17 can be adjusted by hand to initially calibrate the meter and to compensate for variations in specific gravity of the various liquids to be measured and automatically by means of the thermostat to compensate for temperature variations.

In the present case, a range of temperatures from zero to 120° Fahrenheit has been selected. The compensating means is arranged to be in the neutral position shown in Fig. 3 when the temperature of the liquid is at zero temperature. The only liquid then passing from the inlet to the outlet of the meter is that passing through its measuring cylinders. No liquid is then pumped by the variable capacity pump through the by-pass from the meter inlet to the meter outlet. The meter is adjusted so that the volume of liquid which is delivered from its measuring cylinders, when the register indicates one gallon, is less than 231 cubic inches but of such volume as will equal 231 cubic inches when raised to sixty degrees Fahrenheit. With this as a starting point, it will be clear that as the temperature of liquid in the meter increases from zero, it will be necessary for the pump to supply liquid through the by-pass so that the total quantity delivered (that through the measuring cylinders plus that through the by-pass) when the register indicates one gallon, shall be of such volume that, when brought to sixty degree temperature, will equal exactly 231 cubic inches. Thus, the variable capacity pump will pump at faster and faster rate as the temperature rises, reaching its maximum when the temperature reaches 120° Fahrenheit.

The above-described changes in the pumping rates are all effected by the thermostat acting through a transmission which includes ball 93, its adjustable rod 106, the lever 86, screw 83 and rod 75 to shift the pump stator 63. This transmission includes the threaded rod 106 which can be moved to increase or decrease the effective length of the lever 86. In this way, a given amount of movement of the piston 95 of the thermostat can be made to produce more or less movement of rod 75 and stator 63 to compensate for variations in specific gravity of the liquid being measured. A denser liquid would have a smaller co-efficient of expansion than a lighter liquid and the adjustment 106 enables the lower arm of the lever to be shortened for the denser liquid and lengthened for the lighter liquid so as to produce smaller or greater movements of rod 75 and thus stator 63 for any given temperature rise. The graduations 108 are indicative of specific gravity of the different liquids which may be measured by the meter.

The screw 83 is provided for use in initially calibrating the meter. It enables the position of the stator of the variable capacity pump to be adjusted. For example, it enables the stator to be adjusted so that it is located at neutral or zero-pumping position, when liquid of a certain specific gravity, say for example gasoline of .73 specific gravity, is passed through the meter at zero temperature.

The invention thus provides a variable capacity auxiliary pump driven by the meter for pumping liquid from the inlet of the meter through a by-pass to the outlet of the meter at various rates for the purposes of calibration and compensation for variations in temperature and density of the liquid to be measured.

I claim:

1. In combination with a meter, having an inlet for liquid under pressure, an outlet, displacement means connected to receive liquid from the inlet and to deliver liquid to the outlet, and a driving shaft operated by the displacement means in proportion to the volume of liquid displaced thereby, a by-pass from said inlet to said outlet, a variable capacity pump in said by-pass connected to be driven by said shaft and including a stator element and a rotor element, one of said elements being shiftable relatively to the other to vary the pumping rate for any given speed of said shaft, and means responsive to the temperature of the liquid in said meter to control the movement of the shiftable pump element to increase or decrease the pumping rate proportionately with the rise or fall of the temperature of the liquid.

2. In combination with a meter, having an inlet for liquid under pressure, an outlet, displacement means connected to receive liquid from the inlet and to deliver liquid to the outlet, and a driving shaft operated by the displacement means in proportion to the volume of liquid displaced thereby, a by-pass from said inlet to said outlet, a variable capacity pump in said by-pass connected to be driven by said shaft and including a stator element and a rotor element, one of said elements being shiftable relatively to the other to vary the pumping rate for any given speed of said shaft, spring means for moving the shiftable element in one direction, a thermostat in the meter responsive to the temperature of the liquid therein, and a transmission connecting said thermostat to the shiftable pump element for moving the latter in the other direction against the force of said spring means, whereby the thermostat controls the movement of the shiftable element to increase or decrease the rate of pumping proportionately to the rise or fall of the temperature of the liquid.

3. In combination with a meter, having an inlet for liquid under pressure, an outlet, displacement means connected to receive liquid from the inlet and to deliver liquid to the outlet, and a driving shaft operated by the displacement means in proportion to the volume of liquid displaced thereby, a by-pass from said inlet to said outlet, a variable capacity pump in said by-pass connected to be driven by said shaft and including a stator element and a rotor element, one of said elements being shiftable relatively to the other to vary the pumping rate for any given speed of said shaft, spring means for moving the shiftable element in one direction, a thermostat in the meter responsive to the temperature of the liquid therein, and a transmission connecting said thermostat to the shiftable pump element for moving the latter in the other direction against the force of said spring means, whereby the thermostat controls the movement of the shiftable element to increase or decrease the rate of pumping proportionately to the rise or fall of the temperature of the liquid, said transmission being adjustable to vary the extent of movement of the shiftable pump element for any given rise in temperature of the liquid, whereby the pumping rate may be varied to compensate for different coefficients of expansion of the liquid.

4. In combination with a meter having an inlet for liquid under pressure, an outlet, displacement means connected to receive liquid from the inlet and to deliver liquid to the outlet, and a driving shaft operated by the displacement means in proportion to the volume of liquid displaced thereby, a by-pass from said inlet to said outlet, a variable capacity pump in said by-pass connected to be driven by said shaft and including a stator element and a rotor element, one of said elements being shiftable relatively to the other to vary the pumping rate for any given speed of said shaft, spring means for moving the shiftable element in one direction, a thermostat in the meter responsive to the temperature of the liquid therein, and a transmission connecting said thermostat to the shiftable pump element for moving the latter in the other direction against the force of said spring means, whereby the thermostat controls the movement of the shiftable element to increase or decrease the rate of pumping proportionately to the rise or fall of the temperature of the liquid, said transmission including a pivoted lever connected at one point to be moved by said thermostat and at another point to move said shiftable pump element, one said point of connection being movable to change the ratio between the arms of the lever and adjust the transmission and thus the pumping rate for different coefficients of expansion.

5. In combination with a meter, having an inlet for liquid under pressure, an outlet, displacement means connected to receive liquid from the inlet and to deliver liquid to the outlet, and a driving shaft operated by the displacement means in proportion to the volume of liquid displaced thereby, a variable capacity pump having a casing fixed to said meter and through which said shaft passes, said casing having an inlet and an outlet, a rotor fixed to the shaft within the casing, a stator in said casing surrounding the rotor and movable to various degrees of eccentric relation with the rotor, a conduit interconnecting the meter inlet and the pump inlet, a conduit interconnecting the pump outlet and meter outlet, a rod fixed at one end to the stator and extending out of said casing, a thermostat in the meter responsive to the temperature of the liquid therein and having a member movable back and forth as the temperature of the liquid respectively falls and rises, and means connecting said member and rod for moving said stator as the temperature of the liquid varies to vary the rate at which liquid is pumped through said conduits.

6. In combination with a meter, having an inlet for liquid under pressure, an outlet, displacement means connected to receive liquid from the inlet and to deliver liquid to the outlet, and a driving shaft operated by the displacement means in proportion to the volume of liquid displaced thereby, a variable capacity pump having a casing fixed to said meter and through which said shaft passes, said casing having an inlet and an outlet, a rotor fixed to the shaft within the casing, a stator in said casing surrounding the rotor and movable to various degrees of eccentric relation with the rotor, a conduit interconnecting the pump outlet and meter outlet, a rod fixed at one end to the stator and extending out of said casing, a thermostat in the meter responsive to the temperature of the liquid therein and having a member movable back and forth as the temperature of the liquid respectively falls and rises, a lever pivoted on the meter and having one arm connected to said member and the other arm connected to said rod, and means for varying the ratio of said arms.

7. In combination with a meter having an inlet for liquid under pressure, an outlet, displacement means connected to receive liquid from the inlet and deliver it to the outlet, and a driving shaft operated by said displacement means in proportion to the volume of liquid displaced thereby, a by-pass from said inlet to said outlet, a variable capacity pump in said by-pass and connected to be driven by said shaft, said pump including a stator element and a rotor element, one of said elements being shiftable relatively to the other to vary the pumping rate for any speed of said shaft, a thermostat responsive to the temperature of the liquid, a transmission between the thermostat and the shiftable element for moving the latter in one direction from the thermostat, spring means for moving the shiftable pump element in the other direction, said transmission including a first member connected at one end to the thermostat and reciprocable in one path thereby, a second member connected at one end to the stator and reciprocable in another path, a pivoted lever engaged at first and second locations by the other ends of said first and second members, manually adjustable means at said second location on the lever for causing the second member to be moved backwardly or forwardly in its path to initially calibrate the meter, and manually adjustable means on the lever for varying said first location with reference to the fulcrum of the lever and change the pumping rate for liquids having different coefficients of expansion.

ALFRED L. GRISÉ.

REFERENCES CITED

The following references are of record in the file of this patent:

UNITED STATES PATENTS

| Number | Name | Date |
| --- | --- | --- |
| 2,151,201 | Griffith | Mar. 21, 1939 |
| 2,286,411 | Hazard | June 16, 1942 |
| 2,438,934 | Marsh | Apr. 6, 1948 |

Certificate of Correction

Patent No. 2,531,620                                      November 28, 1950

ALFRED L. GRISÉ

It is hereby certified that error appears in the printed specification of the above numbered patent requiring correction as follows:

Column 5, line 70, after the word "which" insert *carries a ball 93 which*; and that the said Letters Patent should be read as corrected above, so that the same may conform to the record of the case in the Patent Office.

Signed and sealed this 30th day of January, A. D. 1951.

[SEAL]

THOMAS F. MURPHY,
*Assistant Commissioner of Patents.*